United States Patent
Miller

(10) Patent No.: US 12,060,020 B2
(45) Date of Patent: Aug. 13, 2024

(54) RADAR ASSEMBLY

(71) Applicant: NISSAN NORTH AMERICA, INC., Franklin, TN (US)

(72) Inventor: Adam Miller, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 383 days.

(21) Appl. No.: 17/515,154

(22) Filed: Oct. 29, 2021

(65) Prior Publication Data

US 2023/0136981 A1 May 4, 2023

(51) Int. Cl.
*B60R 19/48* (2006.01)
*G01S 7/02* (2006.01)
*G01S 13/931* (2020.01)

(52) U.S. Cl.
CPC ............ *B60R 19/483* (2013.01); *G01S 7/027* (2021.05); *G01S 13/931* (2013.01); *G01S 2013/93271* (2020.01); *G01S 2013/93275* (2020.01)

(58) Field of Classification Search
CPC ..... B60R 19/483; G01S 7/027; G01S 13/931; G01S 2013/93275; G01S 2013/93271
See application file for complete search history.

(56) References Cited

U.S. PATENT DOCUMENTS

| | | |
|---|---|---|
| 10,493,934 B2 | 12/2019 | Fernandez et al. |
| 10,710,534 B2 | 7/2020 | Lund et al. |
| 10,797,384 B2 | 10/2020 | Singh |
| 10,850,697 B2 | 12/2020 | Rahman et al. |
| 2018/0301795 A1* | 10/2018 | Lopez, Jr. ............ H01Q 1/3283 |

FOREIGN PATENT DOCUMENTS

| | | | |
|---|---|---|---|
| CN | 213413670 U | | 6/2021 |
| KR | 20160071679 A | * | 12/2014 |

* cited by examiner

*Primary Examiner* — Peter M Bythrow
*Assistant Examiner* — Nazra Nur Waheed
(74) *Attorney, Agent, or Firm* — Global IP Counselors, LLP

(57) ABSTRACT

A radar assembly includes a front bumper assembly, a radar support structure and a radar unit. The front bumper assembly has a support bracket. The radar support structure has first bracket that is fixed to the support bracket. The radar support structure second bracket is movable relative to the first bracket and the support bracket between a rest position and a deformed position. The radar unit is supported to the second bracket to move with the second bracket relative to the first bracket and the support bracket.

14 Claims, 6 Drawing Sheets

RADAR ASSEMBLY

BACKGROUND

Field of the Invention

The present invention generally relates to a radar assembly. More specifically, the present invention relates to a radar assembly that is movable between a rest position and a deformed position.

Background Information

Radar units are installed in many vehicle structures. For example, vehicle radar units are typically attached to rigid brackets that are installed to rigid vehicle body structures. More specifically, a radar unit of a vehicle is often installed on a bracket attached to a front bumper.

SUMMARY

In view of the state of the known technology, one aspect of the present disclosure is to provided a radar assembly comprising a front bumper assembly, a radar support structure and a radar unit. The front bumper assembly has a support bracket. The radar support structure has first bracket that is fixed to the support bracket. The radar support structure second bracket is movable relative to the first bracket and the support bracket between a rest position and a deformed position. The radar unit is supported to the second bracket to move with the second bracket relative to the first bracket and the support bracket.

Also other objects, features, aspects and advantages of the disclosed radar assembly will become apparent to those skilled in the art from the following detailed description, which, taken in conjunction with the annexed drawings, discloses one embodiment of the radar assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
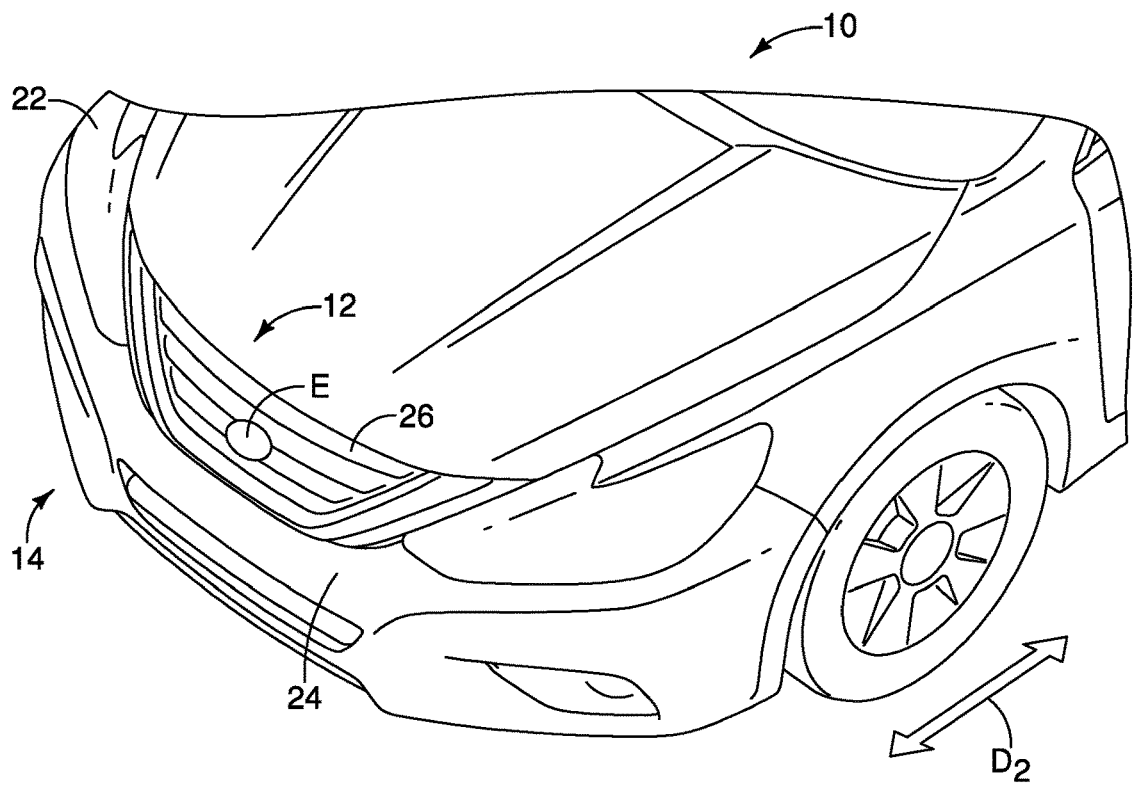
FIG. 1 is a perspective view of a front portion of a vehicle equipped with a radar assembly in accordance with an illustrated embodiment.
Figure 2:
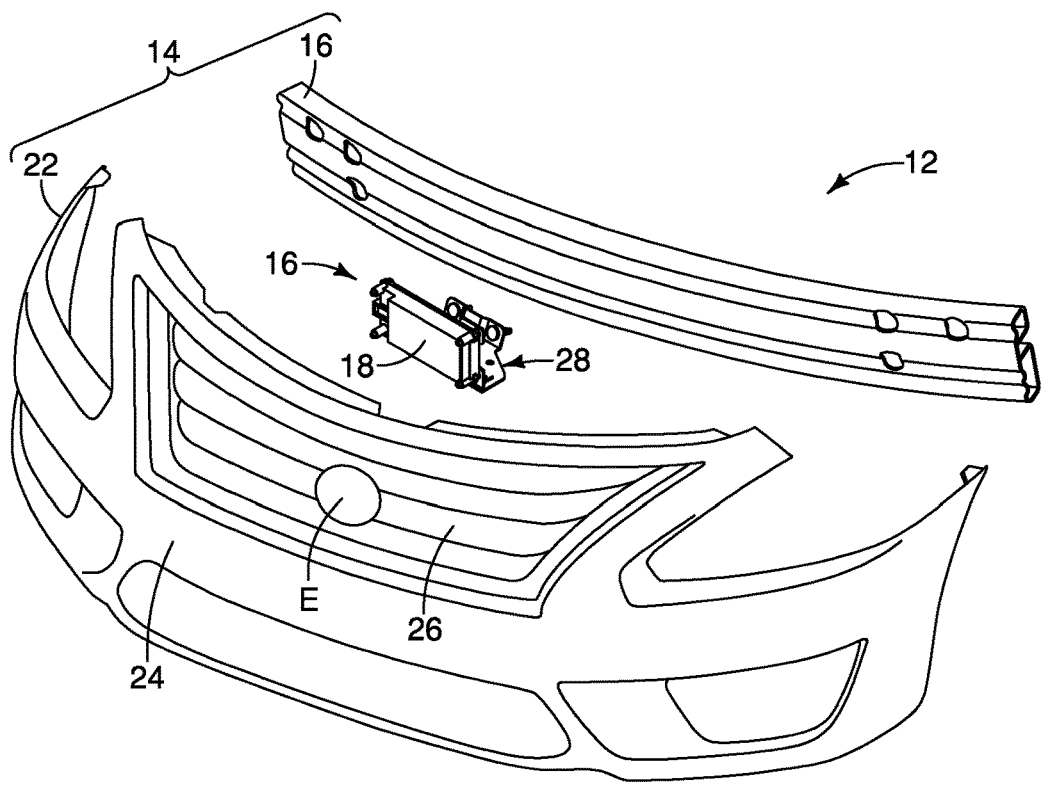
FIG. 2 is an exploded view of the front portion of the vehicle of FIG. 1.
Figure 3:
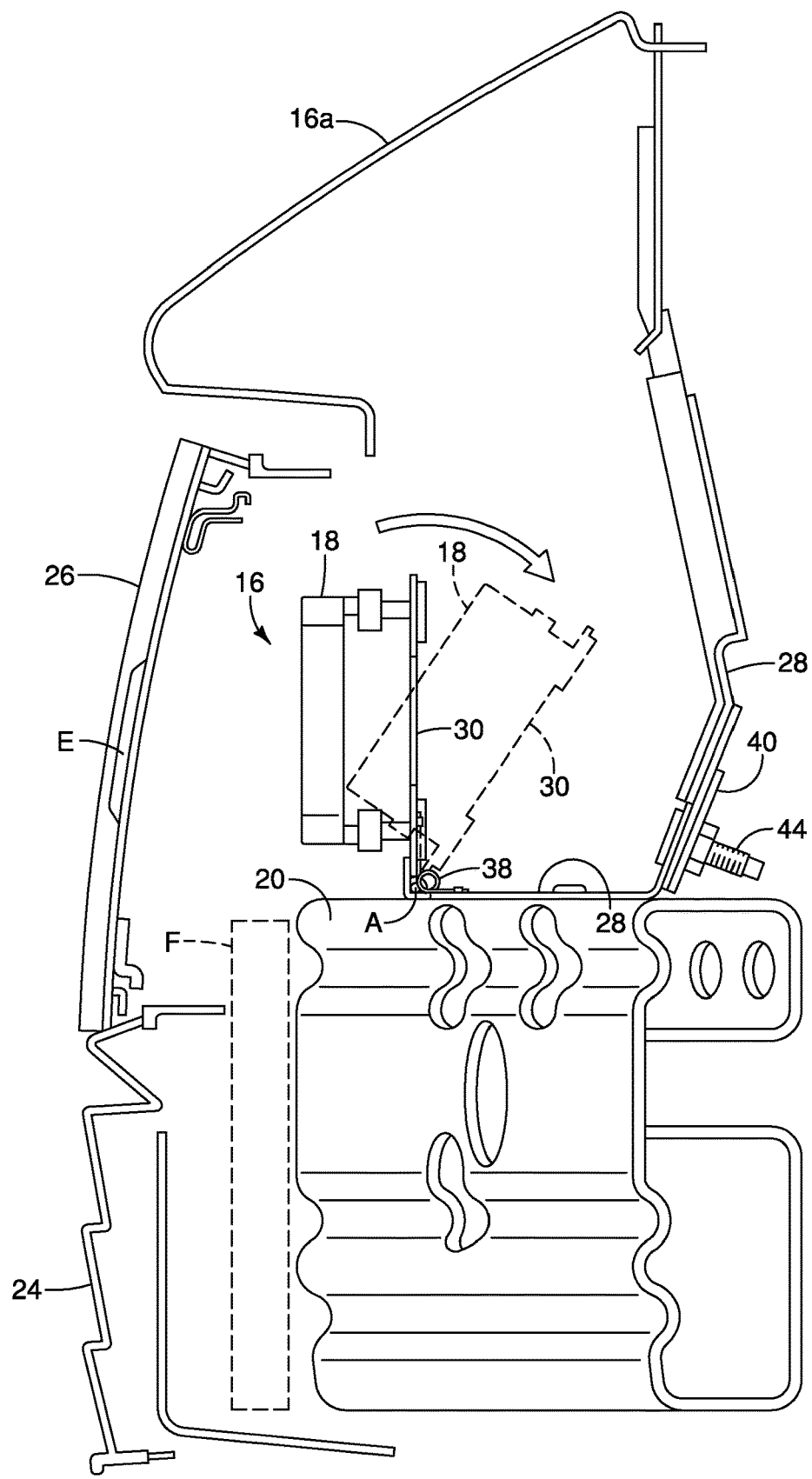
FIG. 3 is a side view of the radar assembly of FIGS. 1 and 2.

Referring to FIG. 1, a vehicle 10 is illustrated as being equipped with a radar assembly 12. The radar assembly 12 comprises a front bumper assembly 14, a radar support structure 16 and a radar unit 18. As shown in FIG. 2, the front bumper assembly 14 includes a support bracket 20. The front bumper assembly 14 further includes a bumper fascia 22 that defines a front end 24 of the vehicle 10. The front bumper assembly 14 further includes a grille 26 that is supported to the bumper fascia 22. As seen in FIG. 3, the front bumper assembly 14 can optionally further include a deformable energy absorption member F (e.g., a foam). The deformable energy absorption member F acts as a foam bumper that is disposed forward of the radar assembly 12. During an impact to the vehicle's 10 front end 24, the energy absorption member F can be crushed such as the bumper facia 22 displaces rearward.

The bumper fascia 22 is attached to various portions of the vehicle's 10 body in a conventional manner. As seen in FIG. 1, the emblem E is shown as positioned on a center of the grille 26. The emblem E is made of a non-interfering material that allows radar signals to readily penetrate and pass therethrough. The emblem E can optionally include or define a vehicle manufacturer's logo. The support bracket 20 can be considered an upper retainer that operates to maintain the components the front bumper assembly 14 attached to the vehicle's 10 body. That is, the support bracket 20 is operatively disposed and positioned to retain and support the bumper facia 22 and the grille 26 to the vehicle 10.

In the illustrated embodiment, the radar support structure 16 extends at least partially forward of the support bracket 20, as seen in FIGS. 2 and 3. That is, the radar support structure 16 protrudes closer to the front end 24 of the vehicle 10 than the support bracket 20. The radar support structure 16 supports the radar unit 18 to the front bumper assembly 14.

The radar unit 18 is part of a radar system (not shown) of the vehicle 10 that includes, for example, an electronic controller (with micro-processor and memory) and a display (not shown) within a passenger compartment of the vehicle 10. The radar unit 18 detects the vehicle's 10 proximity to other vehicles and obstacles that are forward of the vehicle 10. The electronic controller processes signals from the radar unit 18 and displays information on the display for the driver's use. The display of the radar system can be replaced with, or can include an audio device that provides audio signals to the vehicle operator in response to detection of vehicles and/or objects ahead of the vehicle 10. Since radar systems are conventional vehicle components, further description is omitted for the sake of brevity.

The radar unit 18 is installed to the support bracket 20 such that the radar unit 18 is spaced apart rearwardly of the vehicle's 10 emblem E, as best seen in FIG. 3. The radar unit 18 of the illustrated embodiment is preferably aligned in the rearward direction from the vehicle's 10 emblem E. In the illustrated embodiment, the radar unit 18 is preferably positioned and aligned with the emblem E such that radar signals from the radar unit 18 pass through the emblem E to detect objects in front of the vehicle 10.

As stated, the radar support structure 16 is installed to a central portion of the support bracket 20. However, it should be understood from the drawings and description herein that the radar support structure 16 can be installed at any convenient location along the support bracket 20 depending upon the overall design of the vehicle 10 and the location of the emblem E.

As shown in FIGS. 2 and 3, the radar support structure 16 includes a first bracket 28 and a second bracket 30 that are supported to the upper surface of the support bracket 20. In particular, the first bracket 28 is directly installed to the support bracket 20, and the second bracket 30 is supported to the first bracket 28. Therefore, the second bracket 30 is supported to the support bracket 20 via the first bracket 28. In the illustrated embodiment, the first bracket 28 is fixedly installed to the support bracket 20 and is not movable with respect to the support bracket 20.

The second bracket 30 is movably installed to the first bracket 28 and is configured to move relative to the first bracket 28 and the support bracket 20, as will be further described. Therefore, in the illustrated embodiment, the second bracket 30 is configured as an energy absorption member that absorbs the energy from an external impact in the vehicle rearward direction that can cause the radar unit 18 to deform rearwardly. In this way, the energy absorption helps protect the radar unit 18 from damage received from an external vehicle impact. The second bracket 30 is also configured as a positioning member that repositions the radar unit 18 into the correct rest position after deformation.

Figure 4:
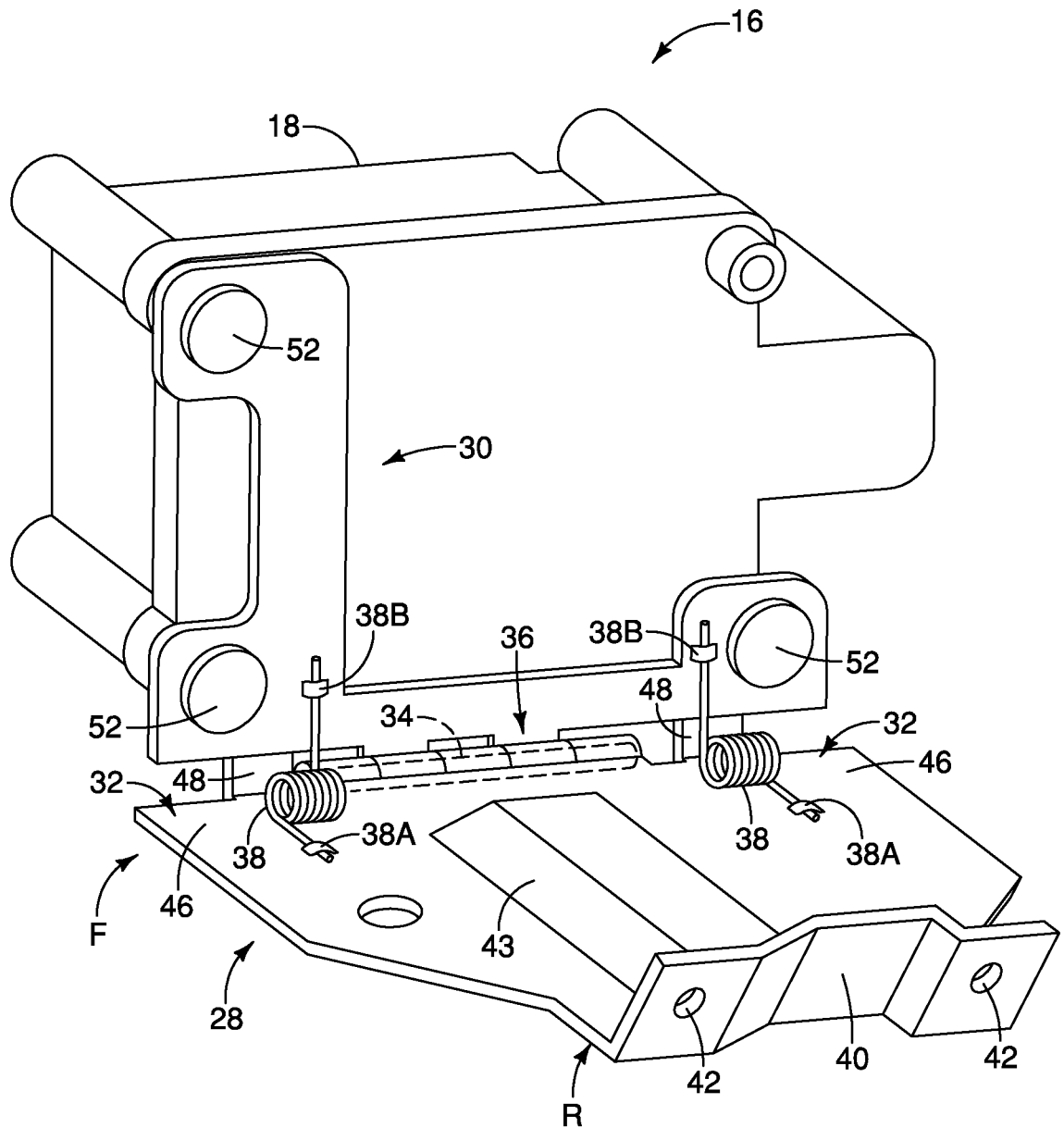
FIG. 4 is a rear perspective view of a radar support structure of the radar assembly.
Figure 5:
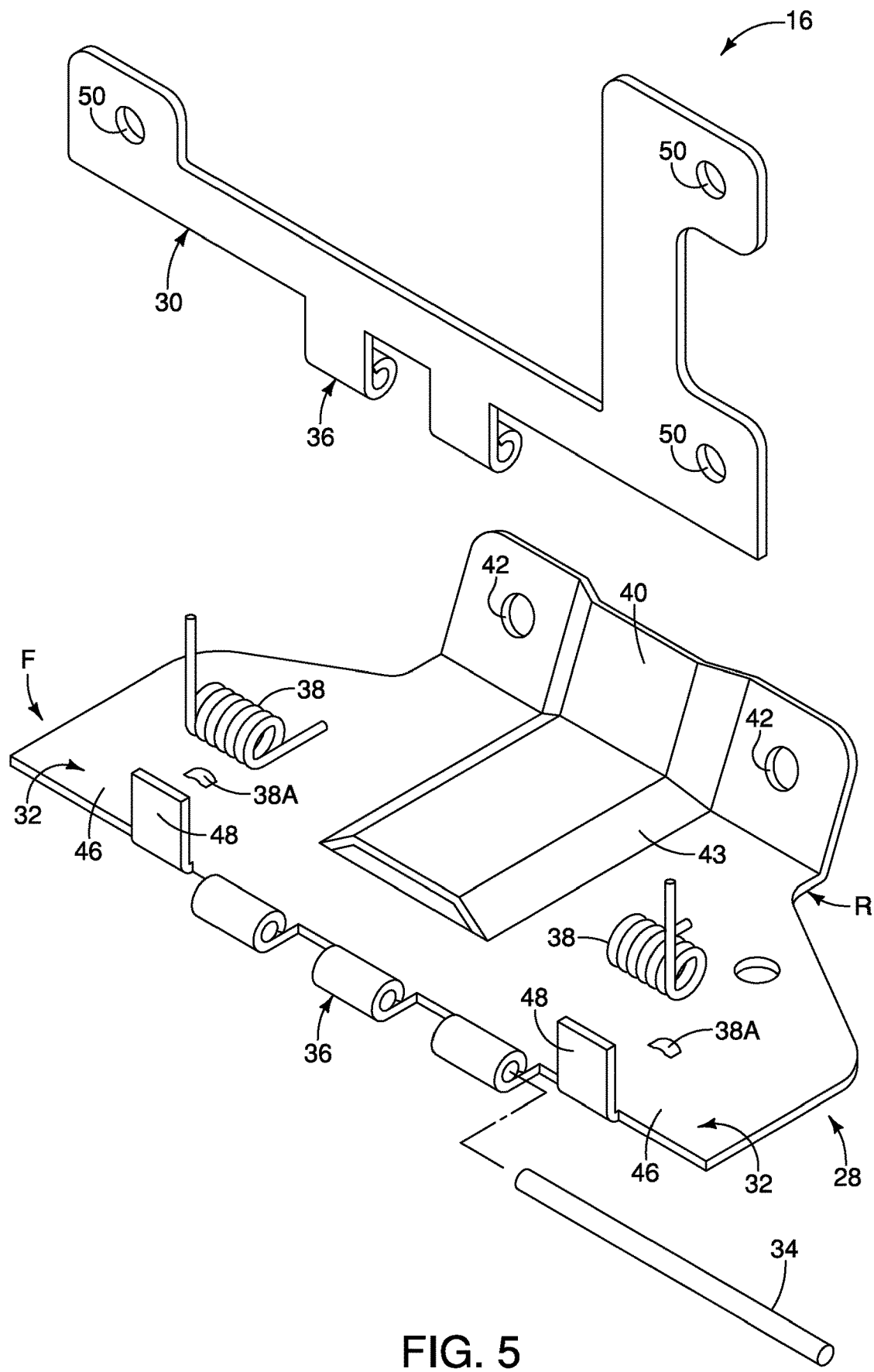
FIG. 5 is a front exploded view of a first and second bracket of the radar support structure.
Figure 6:
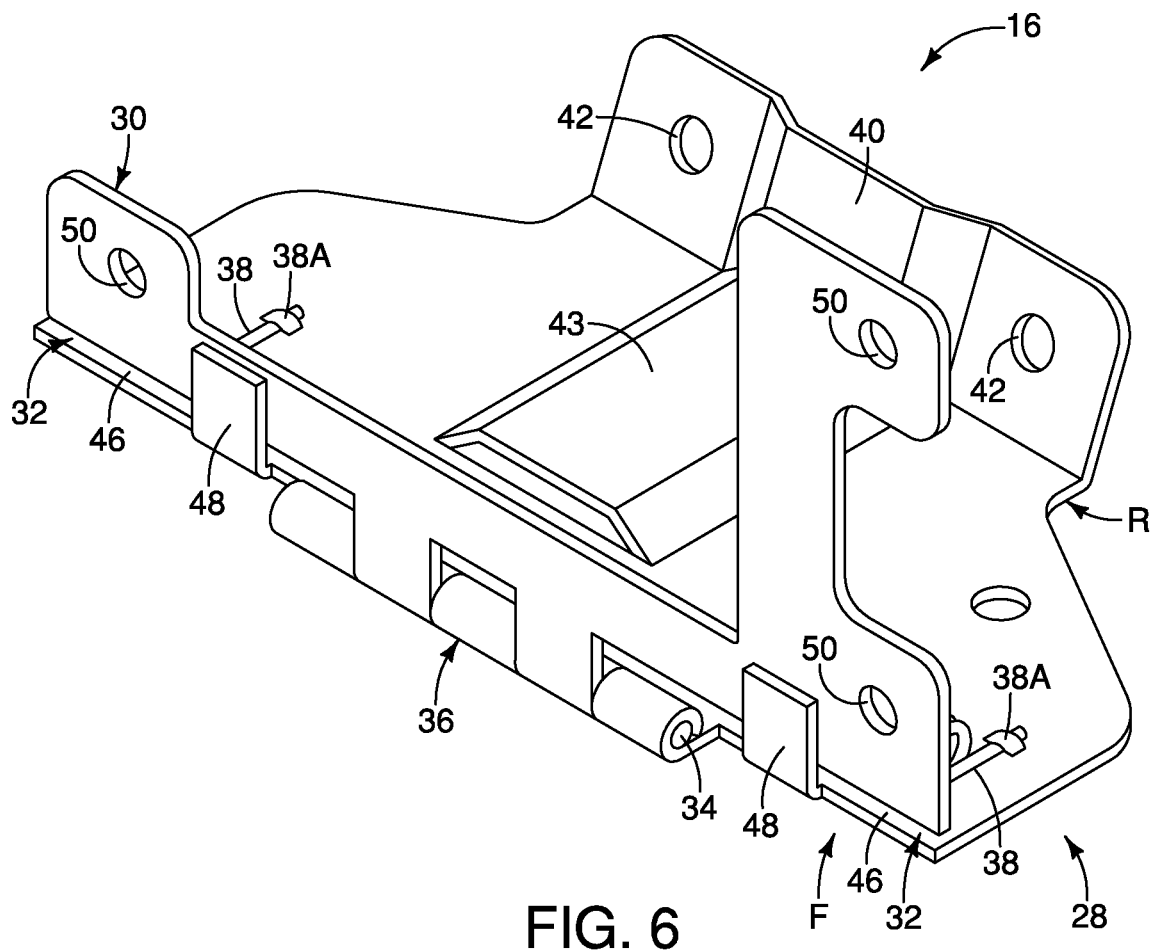
FIG. 6 is front perspective view of the radar support structure similar to FIG. 5 with a radar unit removed.
Figure 7:
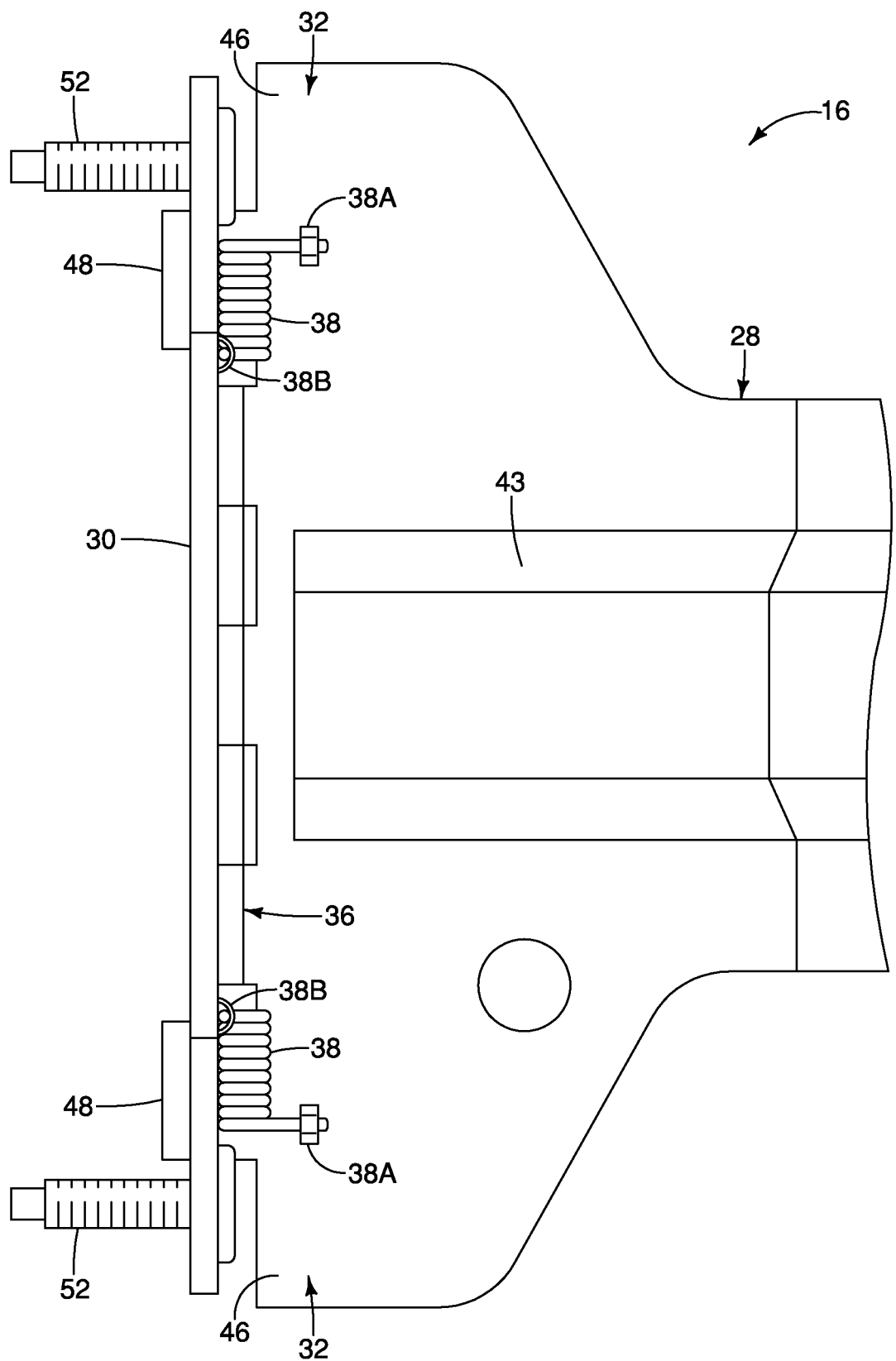
FIG. 7 is a top view of the radar support structure.

As shown in FIGS. 4 to 6, the first and second brackets 28 and 30 together define a receiving area 32 for the radar unit 18. The radar unit 18 is positioned in the receiving area 32 to be installed to the radar support structure 16. In particular, the radar unit 18 is installed to the second bracket 30 to move with the second bracket 30 relative to the first bracket 28 and the support bracket 20. In the illustrated embodiment, the first and second brackets 28 and 30 are hingedly or pivotally connected. As seen in FIG. 4, the radar assembly 12 further comprises a hinge pin 34 movably connecting the first and second brackets 28 and 30. The hinge pin 34 defines a pivot axis A about which the second bracket 28 pivots relative to the first bracket 30. The second bracket 30 pivots with respect to the first bracket 28 about the pivot axis A.

In the illustrated embodiment, the first and second brackets 28 and 30 are movably connected by a hinge 36 that receives the hinge pin 34. As shown in FIG. 5, the first and second brackets 28 and 30 together define the hinge 36. Therefore, the hinge pin 34 extends through both the first and second brackets 28 and 30 to pivotally connect the first and second brackets 28 and 30. The hinge 36 can be a corner hinge that is connected the edges of the first and second brackets 28 and 30. Further, the hinge 36 can alternatively be a leaf hinge or side hinge, as needed and/or necessary. It will be apparent to those skilled in the vehicle field from this disclosure that the radar support structure 16 can include a variety of types of hinges as needed and/or desired.

Referring to FIG. 3, the second bracket 30 is movable relative to the first bracket 28 and the support bracket 20 between a rest position and a deformed position. In the illustrated embodiment, the second bracket 30 extends upright with respect to the first bracket 28 in the rest position. That is, the second bracket 30 is substantially perpendicular with respect to the first bracket 28 in the rest position (as seen in FIG. 3 in full lines). The second bracket 30 bends toward the first bracket 28 in the deformed position (as seen in FIG. 3 in dashed lines). As stated, the radar unit 18 moves with the second bracket 30 between the rest position and the deformed position. That is, the radar unit 18 is configured to move rearward away from the vehicle front end 24 along with the second bracket 30 when the second bracket 30 moves into the deformed position.

As seen in FIGS. 4 and 5, the radar assembly 12 further comprises at least one biasing member 38 operatively connected so the first and second brackets 28 and 30 to bias the radar unit 18 towards the rest position (upright). In particular, the radar assembly 12 preferably includes a pair of biasing members 38 that bias the second bracket 30 into the rest position. That is, the biasing members 38 bias the second bracket 30 toward the vehicle forward direction. Preferably, the biasing members 38 are torsion springs that are disposed on either side of the hinge pin 34. However, it will be apparent to those skilled in the vehicle field from this disclosure that the torsion springs can be positioned at alternative locations as needed and/or desired.

Each of the torsion springs has a first end 38A that is operatively connected to the first bracket 28, and a second end 38B that is operatively connected to the second bracket 30. Therefore, the second bracket 30 is spring biased into the rest position by the at least one biasing member 38. It will be apparent to those skilled in the vehicle field from this disclosure that the radar assembly 12 can include a single biasing member 38 or additional biasing members 38 to bias the first and second brackets 28 and 30 apart as needed and/or necessary.

The first bracket 28 is made from rigid materials such as sheet metal. Preferably, the first bracket 28 is a single, monolithic unitary element formed without seams or breaks. As seen in FIGS. 4 and 5, the first bracket 28 preferably includes indentations and flanges, as needed. The first bracket 28 can additionally include stiffening ribs 43, as seen in FIG. 4. For example, the first bracket 28 includes a mounting flange 40 protruding from a rearward end R of the first bracket 28. The mounting flange 40 includes a pair of through holes 42 for receiving a pair of mounting fasteners 44 therethrough.

The mounting fasteners 44 fix the first bracket 28 to the support bracket 20. The mounting fasteners 44 can be bolts or screws. It will be apparent to those skilled in the vehicle field from this disclosure that the first bracket 28 can alternatively fixed to the support bracket 20 by a clip or other types of fastening means. Therefore, the radar support structure 16 is installed to the support bracket 20 by the mounting flange 40. As best seen in FIG. 3, the first bracket 28 is cantilevered in a forward direction with respect to the support bracket 20 when installed to the support bracket 20.

As best seen in FIGS. 4 and 5, the first bracket 28 has a curved portion 46 that partially defines the receiving area 32 for the radar unit 18. The curved portion 46 extends from a forward end F of the first bracket 28. The radar unit 18 can sit on the curved portion 46 of the first bracket 28 or can be attached to the second bracket 30 at a location elevated of the curved portion 46. Preferably, the curved portion 46 has a width that can support a width of the radar unit 18. It will be apparent to those skilled in the vehicle field from this disclosure that the dimensions of the curved portion 46 can vary depending on the size and dimension of the radar unit 18 as needed and/or necessary.

As seen in FIGS. 3 to 7, the first bracket 28 includes a stopper 48 disposed forward of the second bracket 30. In particular, the first bracket 28 includes a pair of stoppers 48 that extend upwardly from the curved portion 46 such that the stoppers 48 are positioned forward of the second bracket 30. As seen in FIG. 3, the stoppers 48 contact the second bracket 30 when the second bracket 30 is in the rest position. That is, the stoppers 48 prevent the torsion springs 38 from overcorrecting the second bracket 30 by allowing the second bracket 30 to contact the stoppers 48. As seen in FIG. 3, the stoppers 48 are spaced from the second bracket 30 when the second bracket 30 is in the deformed position. In the illustrated embodiment, the stoppers 48 are a pair of stopping plates that extend upwardly from the curved portion 46. However, it will be apparent to those skilled in the vehicle field from this disclosure that the stoppers 48 can alternatively be rubber feet or stops on the curved portion 46.

Referring to FIGS. 5 and 6, the second bracket 30 is also made from rigid material such as sheet metal. Preferably, the second bracket 30 is a single, monolithic unitary element formed without seams or breaks. The second bracket 30 can also include indentations and flanges, as needed. As stated, the second bracket 30 is pivotable relative to the first bracket 28 along the pivot axis when moving between the rest position and the deformed position. The second bracket 30 is pivotable rearwardly towards the first bracket 28 when moving from the rest position to the deformed position. As shown in FIG. 3, the second bracket 30 extends at an acute angle with respect to the first bracket 28 in the deformed position. The second bracket 30 extends at a 90 degree angle with respect to the first bracket 28 in the rest position. As stated, the second bracket 30 abuts the stoppers 48 of the first bracket 28 when in the rest position.

As best seen in FIG. 5, the second bracket 30 includes a plurality of receiving openings 50. The receiving openings 50 receive corresponding fasteners 52 for fastening the radar unit 18 to the second bracket 30. As seen in FIG. 4, the radar unit 18 is mounted to the second bracket 30. As shown, the second bracket 30 includes three receiving openings 50 that define mounting portions for the radar unit 18. It will be apparent to those skilled in the vehicle field from this disclosure that the second bracket 30 can additional different numbers of receiving openings 50 for mounting the radar unit 18 thereon, as needed and/or desired.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the radar assembly. Accordingly, these terms, as utilized to describe the present invention should be interpreted relative to a vehicle equipped with the radar assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A radar assembly, comprising:
   a front bumper assembly having a support bracket;
   a radar support having a first bracket that is fixed to the support bracket, and a second bracket that is movable relative to the first bracket and the support bracket between a rest position and a deformed position;
   a radar unit that is supported by the second bracket to move with the second bracket relative to the first bracket and the support bracket, the first bracket including a stopper disposed in a vehicle forward direction with respect to the second bracket, the stopper contacting the radar unit when the second bracket is in the rest position; and
   at least one biasing member operatively connected to the first and second brackets to bias the radar unit towards the rest position and the stopper, the biasing member biasing the second bracket towards the stopper.

2. The radar assembly according to claim 1, wherein the second bracket extends upright with respect to the first bracket in the rest position, the second bracket bends toward the first bracket in the deformed position.

3. The radar assembly according to claim 2, wherein the second bracket is pivotable relative to the first bracket along a pivot axis when moving between the rest position and the deformed position.

4. The radar assembly according to claim 3, wherein the front bumper includes a grille,
   the second bracket is pivotable in a vehicle rearward direction with respect to the grille towards the first bracket when moving from the rest position to the deformed position.

5. The radar assembly according to claim 1, wherein the at least one biasing member is a torsion spring.

6. The radar assembly according to claim 4, further comprising
   a hinge pin movably connecting the first and second brackets, the hinge pin defining the pivot axis.

7. The radar assembly according to claim 1, wherein the stopper is spaced from the radar unit when the second bracket is in the deformed position.

8. The radar assembly according to claim 7, further comprising
   at least one biasing member operatively connected to the first and second brackets to bias the radar unit towards the rest position.

9. The radar assembly according to claim 8, wherein the at least one biasing member is a torsion spring.

10. The radar assembly according to claim 1, wherein the radar support extends at least partially in a vehicle forward direction with respect to the support bracket.

11. The radar assembly according to claim 10, wherein the first bracket is cantilevered in a vehicle forward direction with respect to the support bracket.

12. The radar assembly according to claim 11, wherein the second bracket extends upright with respect to the first bracket and to the support bracket.

13. The radar assembly according to claim 12, wherein the second bracket is pivotable relative to the first bracket along a pivot axis when moving between the rest position and the deformed position.

14. The radar assembly according to claim 13, wherein the front bumper includes a grille;

the second bracket is pivotable rearwardly with respect to the grille relative to the first bracket when moving from the rest position to the deformed position.

\* \* \* \* \*